Figure 1:
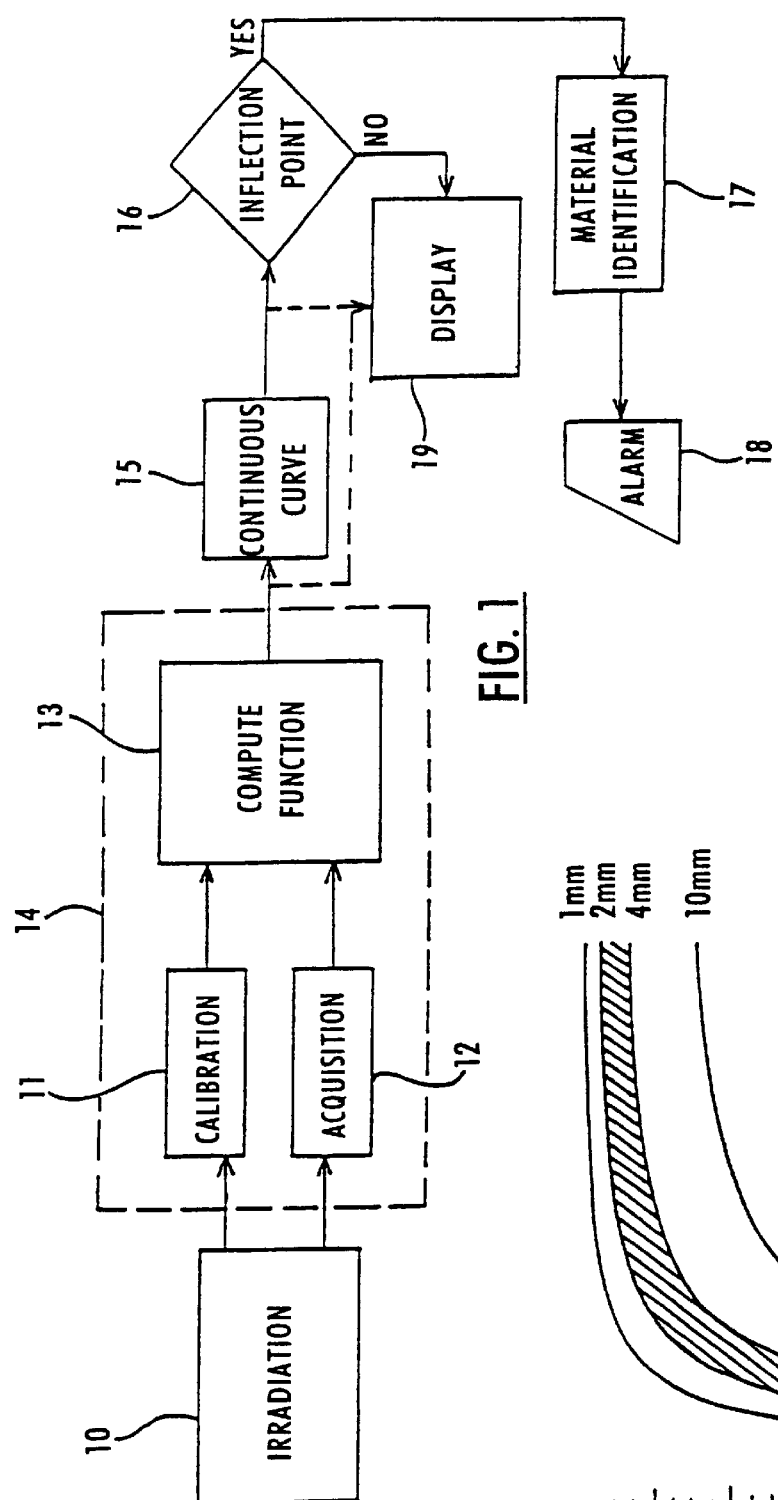

United States Patent [19]
Perion et al.

[11] Patent Number: 5,805,660
[45] Date of Patent: Sep. 8, 1998

[54] METHOD AND DEVICE FOR CARRYING OUT DETECTION OF AT LEAST ONE NON-VISIBLE OBJECT CONTAINING A GIVEN MATERIAL

[75] Inventors: Didier Perion; Serge Maitrejean, both of Paris; Dietmar Sundermann, Orsay, all of France

[73] Assignee: Europ Scan S.A., Rungis Cedex, France

[21] Appl. No.: 596,117

[22] PCT Filed: Jul. 13, 1994

[86] PCT No.: PCT/FR94/00878

§ 371 Date: Jul. 16, 1996

§ 102(e) Date: Jul. 16, 1996

[87] PCT Pub. No.: WO95/04292

PCT Pub. Date: Feb. 9, 1995

[30] Foreign Application Priority Data

Jul. 30, 1993 [FR] France .................................. 93 09414

[51] Int. Cl.⁶ ...................................................... G01V 5/00
[52] U.S. Cl. ................................................. 378/53; 378/57
[58] Field of Search ................................. 378/51, 53, 54, 378/57, 56

[56] References Cited

U.S. PATENT DOCUMENTS

| | | |
|---|---|---|
| 4,317,994 | 3/1982 | Mallozzi et al. ........................... 378/53 |
| 4,839,913 | 6/1989 | Annis et al. . |
| 5,060,249 | 10/1991 | Eisen et al. ................................. 378/57 |
| 5,479,023 | 12/1995 | Bartle ..................................... 378/57 X |

FOREIGN PATENT DOCUMENTS

| | | |
|---|---|---|
| 0 358 965 | 3/1990 | European Pat. Off. . |
| 93 06449 | 5/1993 | France . |

*Primary Examiner*—David P. Porta
*Attorney, Agent, or Firm*—Lowe, Price, LeBlanc & Becker

[57] ABSTRACT

The present invention concerns a method and implementing equipment for detecting at least one object containing a specified material and hidden from view. The method comprising stages of object irradiation by a collimated x-ray beam (21) with an energy range containing a photo-ionization threshold, of detection of the beam having passed through said object (24), is characterized in that furthermore a continuous function representing the attenuation or transmission of the x-rays expressed in terms of energy is determined and a search is made near the energy corresponding to said photo-ionization threshold along the curve representing said continuous function of attenuation or transmission of an inflection point characteristic of the presence of said material. Illustratively this invention is applicable to airport luggage inspection.

9 Claims, 3 Drawing Sheets

METHOD AND DEVICE FOR CARRYING OUT DETECTION OF AT LEAST ONE NON-VISIBLE OBJECT CONTAINING A GIVEN MATERIAL

The present invention concerns a method and an implementing device/equipment for the purpose of detecting one or several objects containing a specific material, said object (s) being hidden from view and illustratively placed in a receptacle or envelope.

In particular the present invention applies to detecting objects enclosed in monitored or inspected luggage in airports or seaports prior to passenger boarding. Even more specifically, the invention applies to detecting detonators/squibs used to trigger the explosion of explosives. The squibs contain very special substances such as lead salts for instance.

Luggage-inspection methods and equipment at airports are known, whereby luggage-contents images are obtained to detect any prohibited or out-of-bounds objects such as weapons and explosives.

The known methods and equipment are based on the following principle: The receptacle, luggage or other is irradiated with an x-ray beam of a given energy spectrum, and thereupon the quantity of x-rays transmitted through the receptacle is measured in order to form a receptacle image. Accordingly a looked-for object is detected by visual recognition of the object shape in the image that was formed in this manner.

In a variation of the prior art, the incident x-ray spectrum is split into two parts, one low-energy part and one part with higher energies in order stress one physical phenomenon over another. Illustratively photo-ionization is predominant at low energies whereas the Compton effect predominates at higher energies. Comparison of the intensities transmitted through the tested object in the two spectrum parts allows separating bodies evincing atomic numbers Z less than or equal to 12 from the other bodies.

The prior art methods incur a number of drawbacks. They provide only little information, insufficient to identify the presence of a particular body.

In this field the invention remedies these drawbacks and proposes a method and equipment to implement said method whereby an object hidden from view and containing a specific material can be detected, and to do so reliably and rapidly, appropriate application being in particular to detecting specific objects containing a given material and placed in luggage when such luggage is being inspected at airports.

For that purpose the method of the invention detecting the presence of at least one specific material contained in an object and evincing a characteristic photo-ionization threshold comprises
object irradiation by a collimated x-ray beam in an energy range including said photo-ionization threshold,
detection of the beam transmitted through said object, and is characterized in that furthermore
a continuous function representing the attenuation or transmission of the x-rays in terms of energy is determined, and
the existence of an inflection point characteristic of the presence of said material is searched for on the curve representing the attenuation or transmission in the vicinity of the said photo-ionization threshold energy.

Preferably the material evinces a photo-ionization threshold K between 10 key and 120 key and more particularly this material evinces an atomic number Z higher than 70.

In a preferred mode of implementation, the material is lead or any lead compound (lead salts . . . )

Advantageously the beam comprises at least two substantially contiguous spectral bands present around the threshold K characteristic of the material being looked for.

In an advantageous implementation of the invention, the attenuation function is determined as follows:

(A) The object transmission function is expressed as finite power expansion of the transmission u of a reference thickness of a reference material, each power of u being associated with a coefficient, the expansion powers being equal to a ratio of the previously determined thicknesses of the reference material to the reference thickness.

(B) The expansion coefficients are determined in the following manner:
the intensity of a test beam is measured for different energy spectra
for each of said energy spectra, the intensity of the beam transmitted by each of the said thicknesses of the reference materials is measured,
for each of said energy spectra, the beam intensity transmitted by the object is measured,
for each of said energy spectra, the intensity of the beam transmitted by the object is resolved into a sum of the intensities measured in the above step and relative to the particular spectrum, said intensities being associated with the searched-for coefficients,
a solution is obtained for the system of equations derived above.

(C) The object attenuation function is derived as a function of u from stages A and B.

Moreover the invention relates to equipment with which to implement the above described method.

The invention is elucidated below by a description of an illustrative and non-limiting implementation in relation to the attached drawing.

Figure 4:
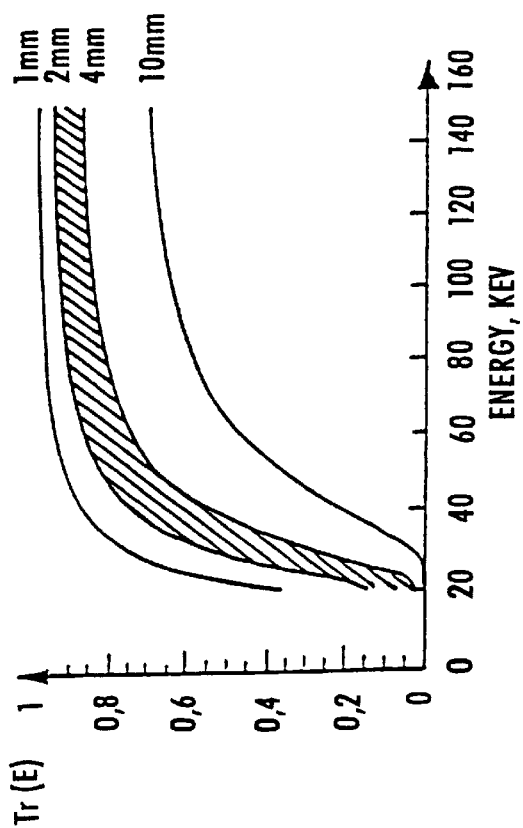
Figure 2:
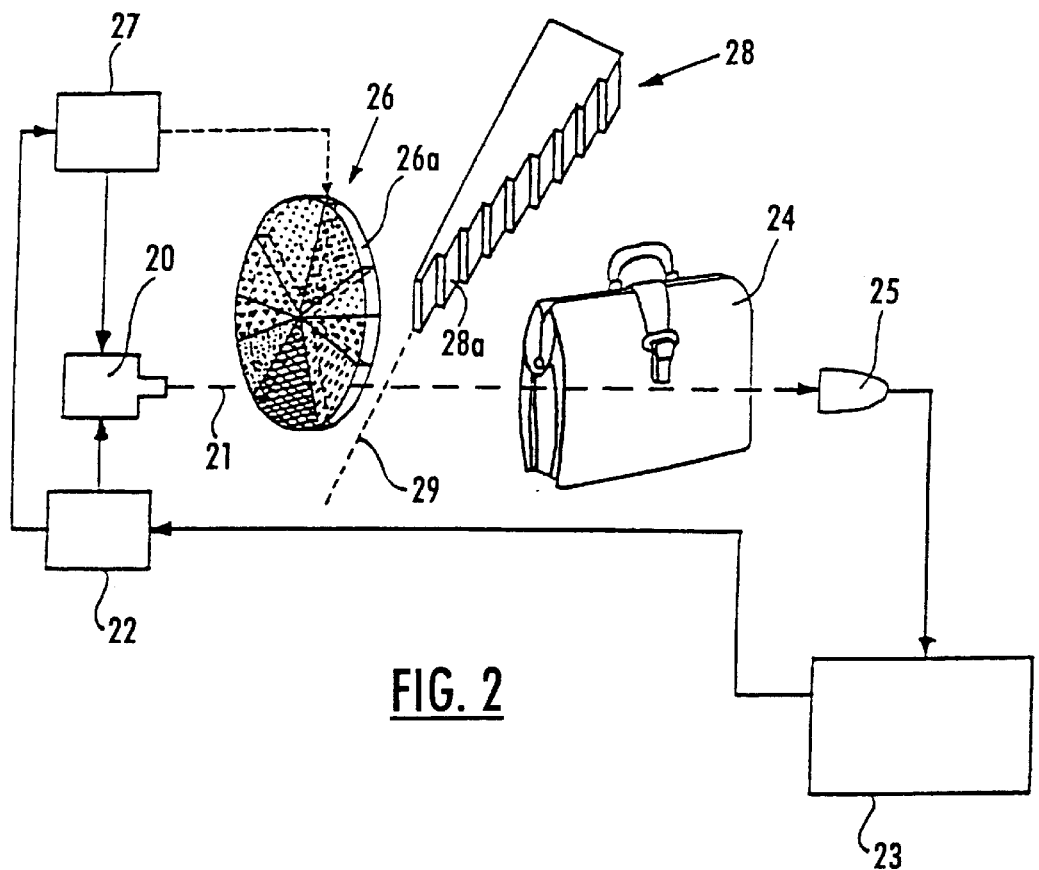
Figure 3:
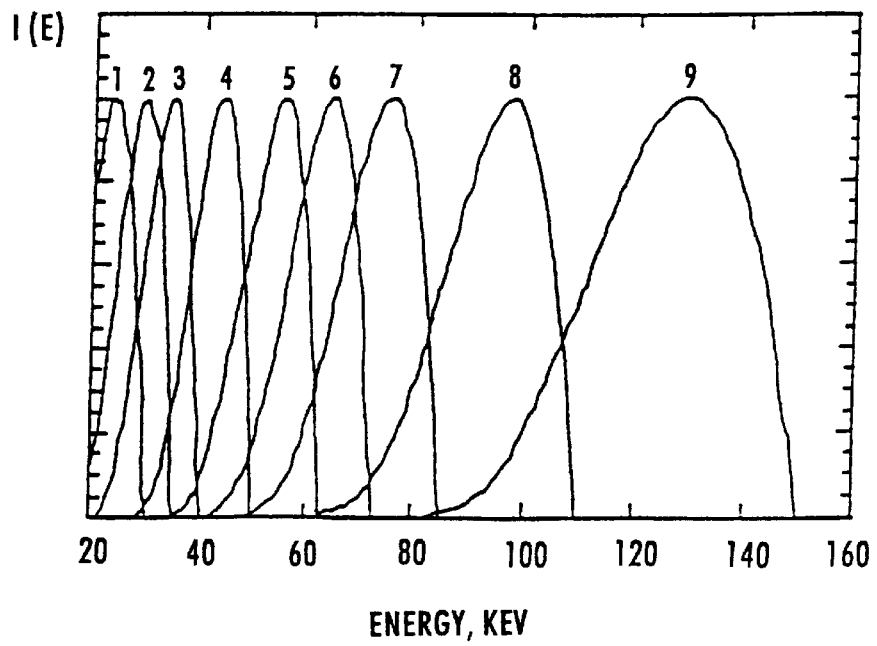
Figure 5:
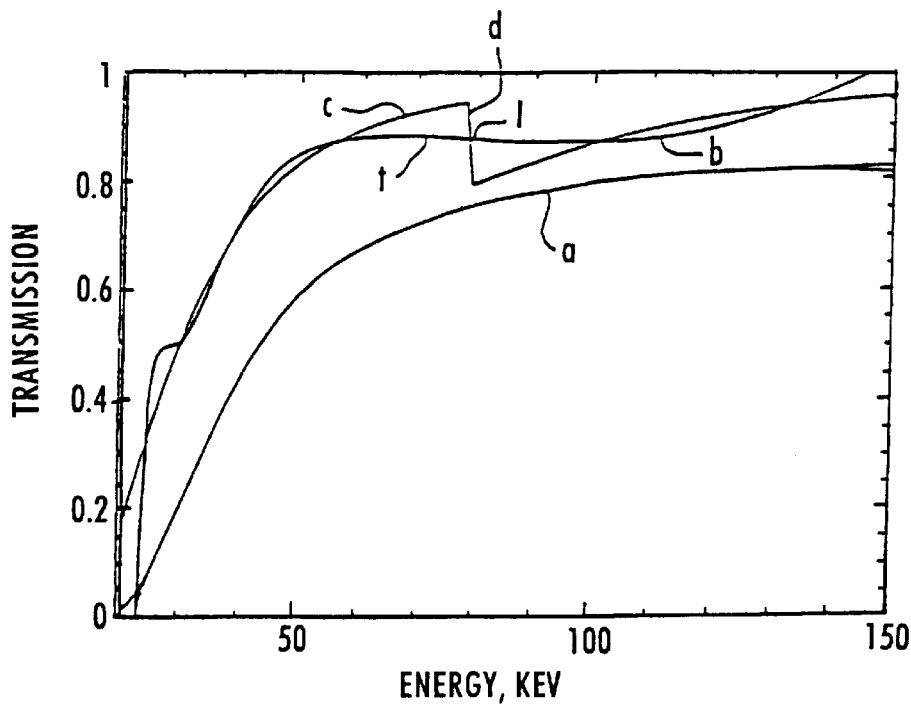
Figure 6:
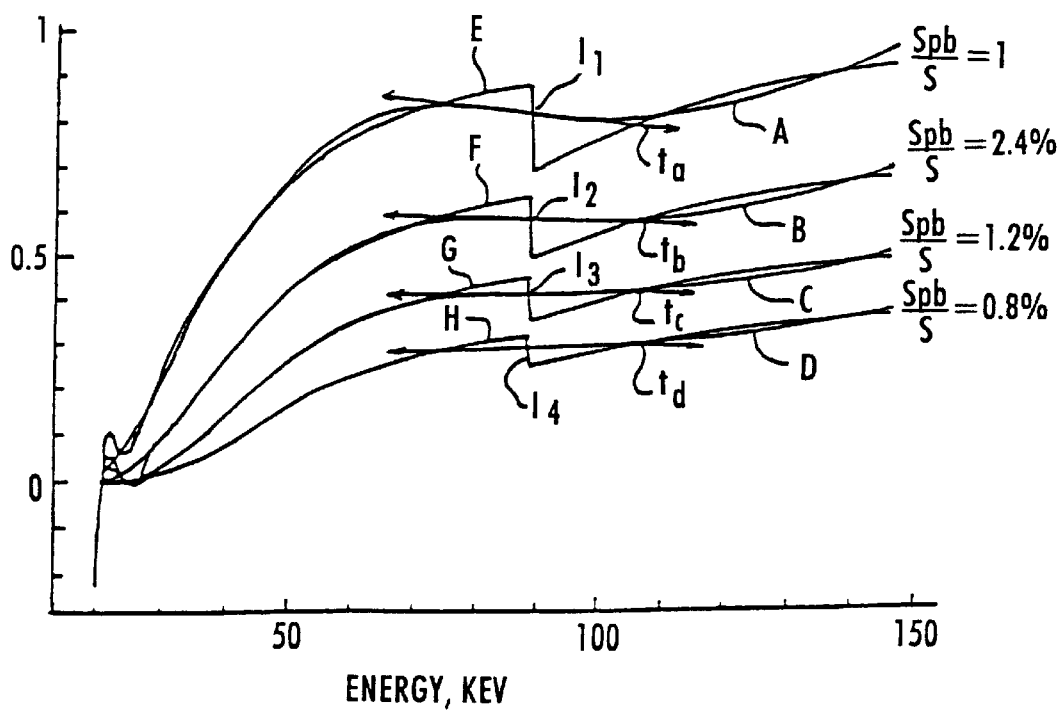

FIG. 1 is a functional block diagram of the stages of the method of the invention, FIG. 2 is a lock diagram of equipment implementing the method of the invention, FIG. 3 illustrates incident spectral bands, FIG. 4 schematically shows changes in transmission expressed in terms of energy for the reference thicknesses, FIG. 5 shows illustrative, empirical curves of changes in transmission in terms of energy, and FIG. 6 shows several empirical curves of changes in attenuation expressed in terms of energy for different objects containing different amounts of lead.

FIG. 1 shows a functional block diagram of the main stages of the method of the invention when used in controlling and inspecting luggage for the purpose of detecting the presence of detonators/squibs for explosives, as a rule such squibs containing lead or mercury. Such inspections are carried out on luggage in the form of suitcases, envelopes/shells, bags or other similar means capable of holding a large number of objects of many varieties amidst which may be hidden for instance a lead-containing squib. For simplicity a receptacle shall be referred to herein and below, it being understood that this term covers the set of all kinds of above-mentioned containers.

The receptacle is initially irradiated in the stage of block 10 by an x-ray beam of specified energy and preferably in the form of different beams evincing adjoining spectral energy bands in the manner discussed further below. The x-rays are detected to carry out a calibration in a first step (block 11) and acquisition in a second step (block 12). Upon termination of calibration and acquisition, the data are processed in order to compute the transmission function of the receptacle being inspected (block 13). The steps of calibration, acquisition and computation of transmission function are combined in a functional block 14, any known technique being used for that purpose. Illustratively such a technique is described in applicant's French patent application 93 06,449 filed on 28 May 1993.

At the output of the functional block 14, the data are processed in block 15 to derive a continuous curve representing the transmission function. It is understood that the attenuation function may be used as well, transmission and attenuation being related in known manner by an exponential function.

The curve so obtained is analyzed at the output of block 15 in order to detect the presence of an inflection point, this stage being symbolically denoted by the diamond-shaped functional block 16 at the output of which and when in the presence of an inflection point, the functional block 17 identifies the material by means of the energy related to the curve's inflection point and then actuates an alarm 18 in the event said detected material for instance evinces the characteristics of a squib. If the curve lacks an inflection point, the data are fed into a functional block 19 permitting viewing the objects inside the receptacle. As an option, a direct link may be implemented at the output of the functional block 14 to display, on the basis of the attenuation or transmission data, the objects inside the receptacle on the monitor.

The means with which to irradiate, to detect for purposes of calibration and acquisition and to compute the transmission function are described next in relation to FIG. 2.

The equipment comprises a variable x-ray source 20 with an energy range of 10 to 500 kev. The source 20 delivers a beam 21 of which the maximum energy is controlled by the variable-voltage control 22 itself driven by a drive/processing system such as a computer 23.

A receptacle 24 is placed in the path of the beam 21 from the source 20. A detector 25 is located beyond the receptacle 24 being inspected and in the path of the beam 21. The detector 25 is linked to the inspection/control computer 23.

In order to irradiate the receptacle 24 with beams of different spectral energy bands, a filtering system 26 allows inserting different filters in the path of the is beam 21 between the source 20 and the receptacle 24, in particular high-pass filters known perse. In a preferred embodiment shown in FIG. 2, the filtering system 26 comprises a sequence of filters 26A arrayed on a disk so that each filter constitutes a particular angular disk sector. The disk 26 is set into rotation by drive means 27 connected to the variable-voltage control 22. The variable-voltage control driving the source 20 is synchronized with the disk rotation in such manner that said source 20 can emit a beam of maximum energy with a corresponding filter inserted into the beam path to effect high-pass transmission and to ensure a lower beam energy limit. The beam so produced and made to cross the inspected receptacle will evince a defined spectral band. In this manner beams are generated with sequential and substantially adjoining or slightly overlapping spectral energy bands such as are illustratively shown in the embodiment corresponding to FIG. 3, each spectral band corresponding to a particular dyad of control and filter. Illustratively the overlap is about 5 kev and the spectral energy ranges run from 20 to 40 kev for energies from 80 to 150 kev and from 10 to 20 kev for energies of 20 to 80 kev.

The calibration step denoted by the block 11 of FIG. 1 is carried out using a cross-sectionally right-triangular prismatic reference component 28 of which the hypothenuse is in the shape of stairway-steps. Accordingly, in the plane of said hypothenuse, the component 28 evinces different and constantly increasing material thicknesses. The component 28 is made of one material only, for instance Duralumin (a mixture of 95% Al, 4.5% Cu and 0.5% Mn), with an effective atomic number Z of about 13.5. A material of which the effective atomic number Z is between 5 and 26 also may be used.

A particular step of the reference component 28 is selected as the reference thickness and in the embodiment shown this is the second step denoted by 28a. For Duralumin the reference thickness is between 1 and 5 mm and in this embodiment it is 4 mm. In the case of steel, the reference thickness is selected between 0.5 and 2 cm, for instance 1 cm.

If there are N thicknesses in the reference component 28, use will be made of N+1 different spectra (FIG. 3). Illustratively, if there are 10 different spectra, the component 28 comprises 9 stairway steps and hence 9 different thicknesses.

The reference component 28 may be translated parallel to itself in a direction symbolically shown by the straight line 29 so as to be inserted into the path of the beam 21 or be kept outside it. This translation of the reference component 28 is carried out in manner known per se and its implementation is omitted from the drawing.

FIG. 4 is a schematic plot of transmission in terms of energy for a Duralumin component 28 and for each of the particular thicknesses from 1 to 10 mm.

Presently the stage corresponding to the block 14 and consisting in determining the attenuation or transmission function will be described.

In a preliminary step, calibration measurements are taken, namely the measurements of the intensity transmitted through the various reference-material thicknesses exposed to the test beam 21. To begin with, this transmitted intensity is measured for zero thickness, that is the component 28 is outside the beam path. The detector 20 measures the intensity of the test beam for each spectrum and these measurements are stored by the processing system 23.

Thereupon similar measurements are carried out by consecutively inserting the different thicknesses of the reference component 28 into the beam path. After these measurements have been stored by the system 23, the component 28 is removed from the beam path.

This removal terminates the calibration step.

Acquisition is implemented next.

The inspected receptacle 24 is then placed into the beam path and thereby it is exposed to each spectrum. For each spectrum, the intensity transmitted through the receptacle is measured by the detector 20, then it is stored.

The system 23 derives an analytical formula of the object transmission at the site crossed by the beam and stated in the form of a parameter u which is the transmission through a particular thickness of a reference material, for instance Duralumin, in the manner described below and relating to x-rays. This approach is immediately transferrable to the case of gamma rays and steel. The reference thickness is selected to be that of the second step of the component 28.

Accordingly $u = e^{-att(E)[2.7][0.4]}$, where $att(E)$ is the attenuation per unit mass, $2.7$ is the Duralumin density in g/cm³ and $0.4$ is the reference thickness selected to be 4 mm and expressed as 0.4 cm.

Letting the index j be the spectrum number to which the receptacle is being exposed, with j=1 relating to the lowest energy spectrum, then the intensity $D_j$ transmitted through the receptacle is given by $$D_j = \int I_j(E) T_r(E) dE \text{ also } D_j = \int I_j(E) e^{-att(E)} dE \quad (1)$$

where $I_j(E)$ is the intensity of the jth energy spectrum as a function of the energy E, $T_r(E)$ and att(E) are resp. the transmission and attenuation functions in terms of E.

By changing variables and introducing the parameter u related to the reference thickness ep in cm of the selected material evincing a density $\rho$ in g/cm³, it follows that $$u=e^{-att(E)[-ep][\rho]} \text{ with } D_j = \int I_j(u) e^{-att'(u)} du \qquad (2)$$

where $I'_j(u)$ is the intensity of the jth spectrum expressed as a function of u and where att'(u) is the attenuation function to be ascertained.

The object transmission function is expressed in terms of the parameter u on the basis of the following approximation: the object transmission function is stated as a finite polynomial expansion of powers of the parameter u, namely as $$e^{-att'(u)} = \sum_{i=0}^{N} a_i u^{f(i)} \qquad (3)$$

where i is an index varying from 0 to N. The number of expansion terms (N+1) is less than or equal to the number of different energy spectra used in the transmission measurements; consequently this number of terms equals the number N of reference material thicknesses plus 1. As a result, each index i corresponds to a step number in the component 28, the index i=0 corresponding to zero thickness, that is, to the component 28 being outside the beam path.

For each value of i, f(i), which is the particular power of the expansion, represents a ratio of one of the reference-material thicknesses to the reference thickness, this ratio preferably being such that the powers f(i) increased by ½ constitute a geometric series of which the common ratio is a root of 3, namely $$f(i)+\tfrac{1}{2}=a^i[f(0)+\tfrac{1}{2}] \qquad (4).$$

Moreover $f(0) \equiv 0$, because i=0 represents the unimpeded beam path and hence zero thickness, $$f(i)=\tfrac{1}{2}(a^i-1) \qquad (5).$$

As a result, if the second step 28a is selected as the reference thickness, f(2)=1 and a=∛3.

It can be shown that the intensity transmitted through the object for the spectrum j can be resolved as follows:

$$D_j = \sum_{i=0}^{N} a_i C_{ji} \qquad (6)$$

For each spectrum j, the terms $C_{ji}$ correspond to the intensity transmitted through the different reference-material thicknesses, i=0 corresponding to zero thickness (the component 28 being outside the beam path).

In eq. 6, the terms $D_j$ and $C_{ji}$ are determined by measurement, the coefficients $a_i$ are unknown. The number of reference-material thicknesses (including the zero thickness) may be selected less than or equal to the number of spectra in order to determine the coefficients $a_i$. In the shown embodiment, 10 different energy spectra are available, the component 28 comprising 9 steps to which must be added the additional measurements for the component 28 being outside the beam path.

Using the values stored during calibration and acquisition tests, the system 23 determines the $a_i$ coefficients. This determination may be carried out by any known is procedure, for instance that of the least squares.

Once the coefficients $a_i$ have been determined, the system 23 substitutes their values into the equation 3 and thereby computes the receptacle transmission function expressed in u.

After the transmission function has been determined in terms of the energy, the next stage consists in examining this function for changes representing the inflection point of the graph of the function. The determination of the graph/curve of this continuous function is symbolically shown by the functional block 15 of FIG. 1. FIG. 5 shows three curves, namely a first curve a of the transmission function of the reference component 28, a second mathematically computed curve b derived in the previously discussed manner and corresponding to the transmission function of a platinum body and a third curve c corresponding to the actual transmission of an object containing a specified material, namely platinum. This curve may be obtained empirically by measuring the intensity of transmission through the receptacle in terms of the x-rays energy, using a monochromatic x-ray beam and increasing the energy of the x-rays stepwise.

The reference curve a evinces a first rising portion followed by a plateau. The computed curve b representing the platinum-containing object also evinces a rising portion but with higher transmissions than the reference curve a, followed by a slightly descending plateau and then followed by a third, slightly rising portion. The middle portion of curve b corresponding to the descending plateau comprises an inflection point I mathematically corresponding to a change in curvature and with zero second derivative of the function represented by the curve b. The tangent at point I of curve b is shown as t.

Curve c also comprises a rising portion which substantially corresponds to that of curve b. In its middle portion, the curve c, corresponding to that of the curve b with its inflection point I, a discontinuity d is present in the vicinity of the said inflection point of curve b. The third portion of the curve c essentially tracks that of the curve b. The d discontinuity of curve c shows the abrupt drop in transmission through the platinum body, this phenomenon corresponding to the photo-ionization threshold K of platinum which takes place at a fixed energy of 78.4 kev. At values less than this threshold, for instance between 65 and 78 kev, the curve c is above the curve b.

Once the representative curve for the object or receptacle being inspected has been found, the method of the invention includes a search for an inflection point as symbolized by the functional block 16 (FIG. 1). The search for the inflection point may be carried out by any known mathematical procedure, for instance by looking for the zero of the second derivative.

In the event an inflection point is found, the method of the invention then goes on to determine the magnitude of the energy corresponding to the photo-ionization threshold of the material causing the phenomenon in curve b. The photo-ionization threshold K is characteristic of the material being looked for. This stage is symbolized by the functional block 17 of FIG. 1. Thereupon an alarm is actuated to alert the operators of the presence of a prohibited body or object such as a squib for instance when lead is detected. In this particular instance the threshold K is 88 kev.

Obviously the invention also applies to detecting other bodies and preferably so-called heavy materials, that is with an atomic number Z higher than 70, illustratively mercury (83 kev), gold (80.7 kev), tungsten (69.5 kev).

Preferably the spectral bands are selected in such manner that at least two spectral bands are located one on each side of the threshold K of the material being looked for, and that they be adjoining or even slightly overlapping in the vicinity of said threshold.

FIG. 6 shows different curves each for the measurement of the computed transmission in terms of energy of an object composed of PVC (polyvinyl chloride) and of lead for lead percentages varying from 100% to 0.8%, the curves resp. being denoted by the references A, B, C and D. These curves evince resp. inflection points $I_1$, $I_2$, $I_3$ and $I_4$, of which the (common) abscissa in the vicinity of 88 kev corresponds to the lead photo-ionization threshold K. Another set of curves is shown in FIG. 6, one for each of the curves A through D, corresponding to the true transmission of a lead body for the quantity of the example. These true transmission curves may be obtained empirically as indicated above for the curve c of FIG. 5. The curve E representing the transmission of an object containing a corresponding mass of lead (that is 0.05 g/cm$^2$) corresponds to the curve A. Curve F corresponds to the curve B. Curve G corresponds to the curve C.

Curve H corresponds to the curve D. The curves E, F, G and H are determined mathematically and evince a discontinuity in the form of a sub-vertical segment passing through the resp. inflection points $I_1$ through $I_4$. The tangents $t_a$, $t_b$, $t_c$ and $t_d$ to said curves A through D at said resp. inflection points $I_1$ through $I_4$ are also shown.

Be it noted furthermore that the higher the lead content in the total object mass being irradiated increases, the larger the discontinuity or jump of the theoretical curves. This feature is evinced by a steeper slope (in absolute value) of the corresponding tangent at each inflection point. In other words, the higher the lead contents, or looked-for material, the more pronounced the inflection and the easier the detection.

Even though the invention was described in its application to detecting detonators/squibs for explosives that contain lead and within the field of luggage inspection, said invention also is applicable to other fields such as the detection of any body other than lead.

In summary the invention is not restricted to the above shown modes of implementation but on the contrary also covers any variations such as stated in the claims below.

We claim:

1. A method for detecting the presence of at least one specific material contained in an object, said material evincing a characteristic photo-ionization threshold, wherein:

the object is irradiated by a collimated x-ray beam within an energy range containing said photo-ionization threshold, the transmitted beam having passed through said object is detected, characterized in that a continuous function representing the x-ray attenuation or transmission in terms of energy is determined, a search is made for the existence of a characteristic inflection point on the curve representing said continuous function of attenuation or transmission in the vicinity of the energy corresponding to said photo-ionization threshold of said material.

2. Method defined in claim 1, characterized in that said material evinces a photo-ionization threshold K between 10 kev and 120 kev.

3. Method defined in claim 1, characterized in that said material evinces an atomic number Z higher than 70.

4. Method defined in claim 3, characterized in that the material contains lead.

5. Method defined in claim 1, characterized in that the determination of the transmission or attenuation functions includes the following stages:

A) The object transmission function is stated in the form of a finite power expansion of the transmission u of a reference thickness of a reference material, a coefficient being assigned to each power of u, the expansion powers being equal to a ratio of the previously determined reference-material thicknesses to the reference thickness, B) The expansion coefficients are determined:
(a) by measuring the test-beam intensity at different energy spectra,
(b) by measuring the beam intensity transmitted by each of the involved thicknesses of the reference material for each of said energy spectra,
(c) by measuring the beam intensity transmitted by the object for each of said energy spectra, (d) by resolving the beam intensity transmitted by the object into a sum of the intensities measured in stage B) (b) relative to the spectrum involved for each of said energy spectra, the searched-for coefficients being assigned to said intensities,
(e) by solving the system of equations obtained in the step B) (d), (C) The object attenuation or transmission function in terms of u is derived from the stages A and B.

6. Application of the method defined in claim 1 to detecting detonators/squibs for explosives.

7. Method defined in claim 5, characterized in that said energy spectra partly overlap and in that their number is equal to the number of reference thicknesses increased by 1.

8. Equipment for detecting the presence of at least one specified material present within an object, comprising:

means irradiating the receptacle with a collimated x-ray or gamma-ray beam corresponding to at least one spectral energy band, means detecting the transmitted beam having passed through said object, means determining a function representing the changes in attenuation or transmission in terms of energy, characterized in that it comprises furthermore:

means for obtaining a continuous curve representing said function, means looking for at least one inflection point on said curve, and means determining the energy corresponding to said inflection point and characteristic of said detected material.

9. Detection equipment defined in claim 8, characterized in that said material is lead and said object is a detonator/squib for explosives.

* * * * *